(12) United States Patent
Marcus

(10) Patent No.: US 7,877,400 B1
(45) Date of Patent: Jan. 25, 2011

(54) OPTIMIZATIONS OF XPATHS

(75) Inventor: Matthew Marcus, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1905 days.

(21) Appl. No.: 10/716,840

(22) Filed: Nov. 18, 2003

(51) Int. Cl.
 *G06F 7/00* (2006.01)
 *G06F 17/30* (2006.01)

(52) U.S. Cl. ............ 707/758; 707/713; 707/722; 707/736; 707/802; 715/234; 715/239

(58) Field of Classification Search ........ 707/3, 707/10, 6
 See application file for complete search history.

(56) References Cited

U.S. PATENT DOCUMENTS

| | | | |
|---|---|---|---|
| 6,556,983 B1* | 4/2003 | Altschuler et al. | 706/55 |
| 7,113,942 B2* | 9/2006 | Levanoni et al. | 1/1 |
| 7,171,404 B2* | 1/2007 | Lindblad et al. | 1/1 |
| 7,315,852 B2* | 1/2008 | Balmin et al. | 707/715 |
| 2001/0037496 A1* | 11/2001 | Simonyi | 717/7 |
| 2002/0156772 A1* | 10/2002 | Chau et al. | 707/3 |
| 2003/0140308 A1* | 7/2003 | Murthy et al. | 715/500 |
| 2003/0177443 A1* | 9/2003 | Schnelle et al. | 715/513 |
| 2003/0204511 A1* | 10/2003 | Brundage et al. | 707/100 |
| 2004/0064693 A1* | 4/2004 | Pabla et al. | 713/168 |
| 2004/0073541 A1* | 4/2004 | Lindblad et al. | 707/3 |
| 2004/0103105 A1* | 5/2004 | Lindblad et al. | 707/100 |
| 2004/0111396 A1* | 6/2004 | Musayev et al. | 707/3 |
| 2005/0050016 A1* | 3/2005 | Stanoi et al. | 707/3 |
| 2005/0097084 A1* | 5/2005 | Balmin et al. | 707/3 |

OTHER PUBLICATIONS

Traversal Semantics in Object Graphs [online], 5 pages. Downloaded from <http://www.ccs.neu.edu/research/demeter/biblio/strategies.html>.
W3C, XML Path Language (XPath), Version 1.0 [online], Nov. 16, 1999, 35 pages. © 1999 W3C®. Downloaded from <http://www.w3.org/TR/xpath>.
W3C, XML Schema [online], 14 pages. © 2000-2003 W3C®. Downloaded from <http://www.w3.org/XML/Schema#dev>.

* cited by examiner

*Primary Examiner*—Usmaan Saeed
(74) *Attorney, Agent, or Firm*—Fish & Richardson P.C.

(57) ABSTRACT

Methods and apparatus, including computer program products, for searching for one or more logical elements in a hierarchical tree structure of an extended markup language document conforming to a schema used for XML. The method includes the steps of (1) providing a representation of an extended markup language document instance containing two or more logical elements, one being a parent node and one a child node in a hierarchical tree structure describing the representation; (2) receiving a query for logical elements satisfying an XPath expression; and (3) searching in the hierarchical tree structure only nodes that potentially have child nodes satisfying the XPath expression.

38 Claims, 4 Drawing Sheets

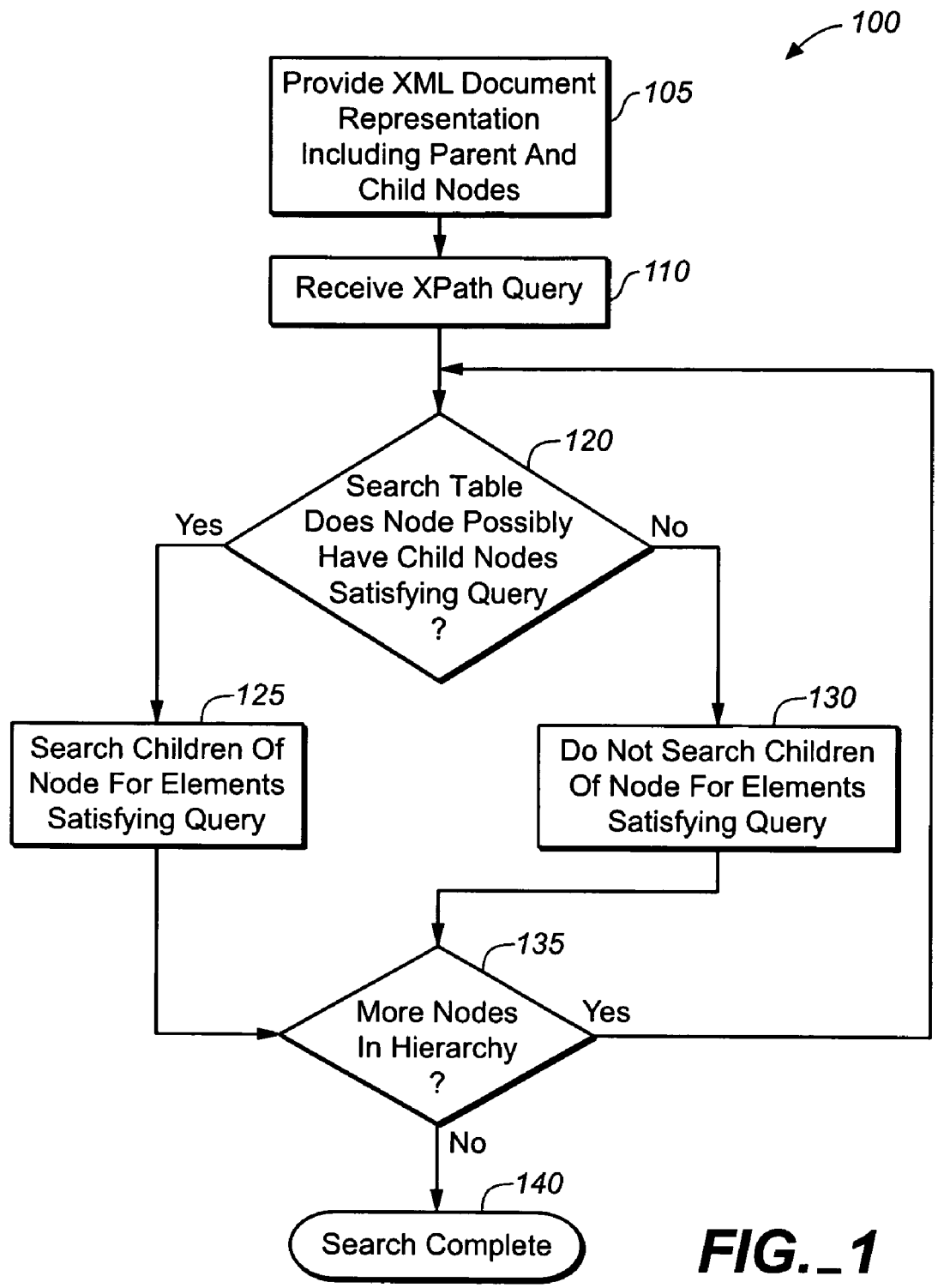
FIG._1

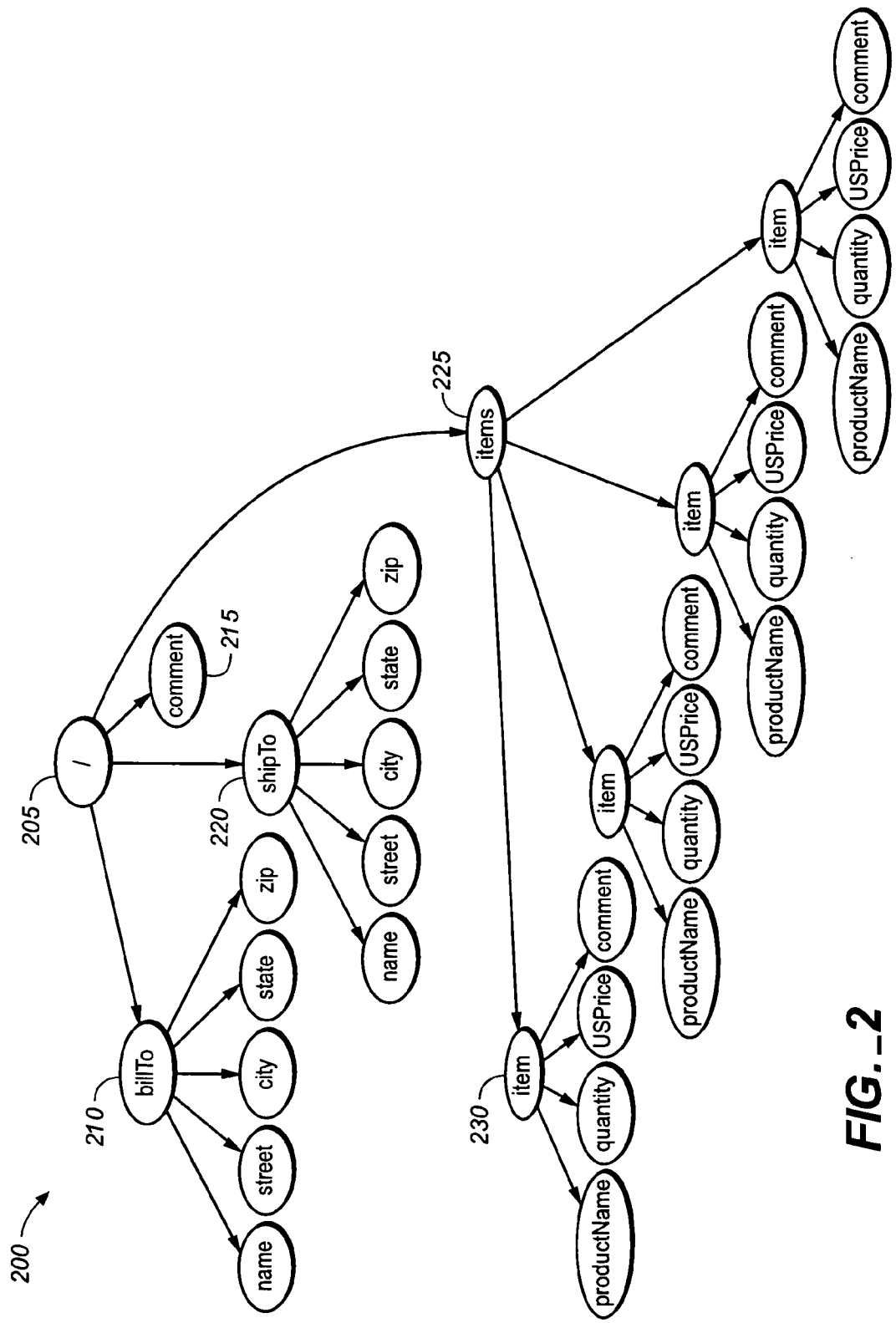
FIG._2

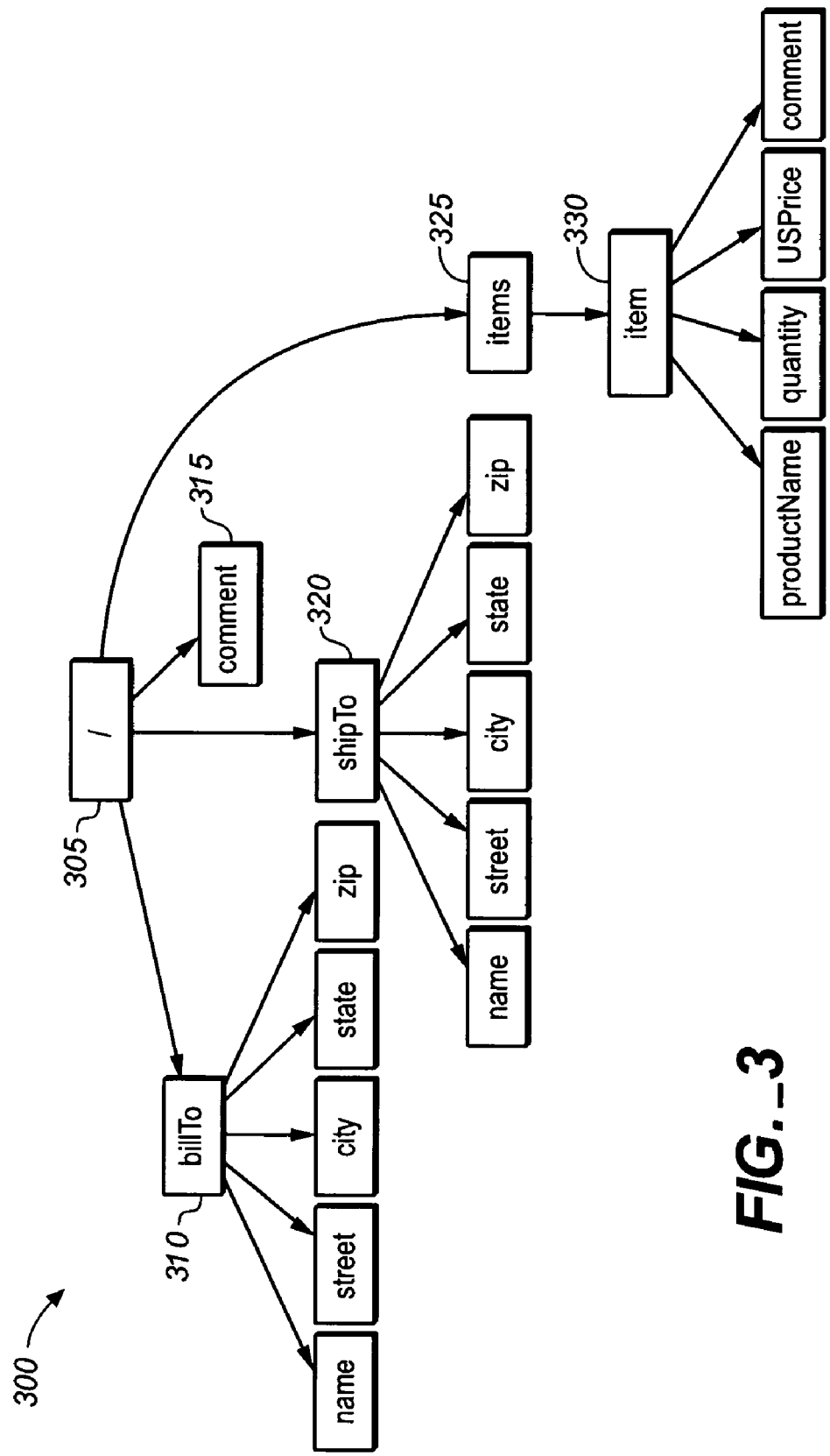
FIG._3

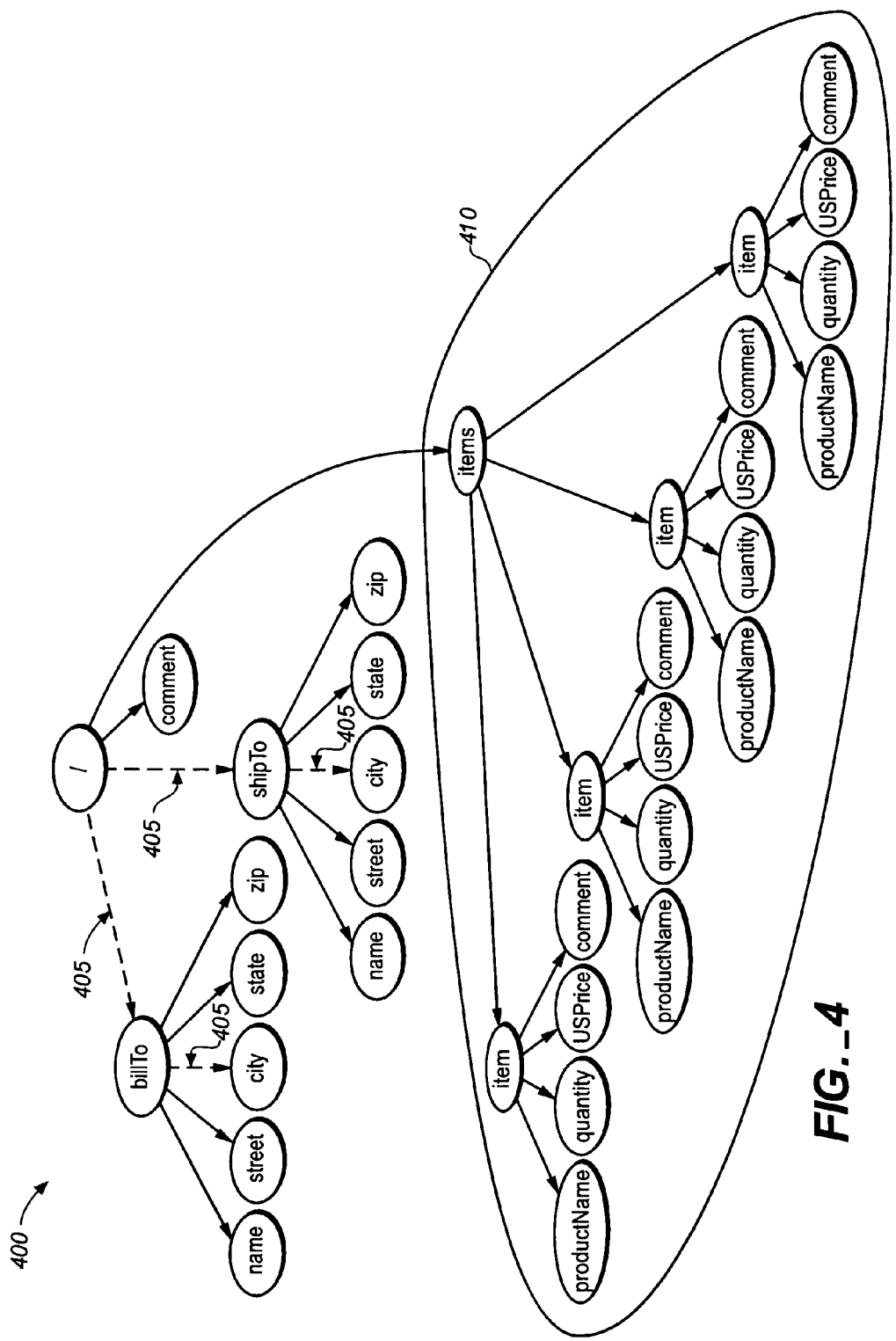
FIG._4

OPTIMIZATIONS OF XPATHS

BACKGROUND

This invention relates to searching of data structures.

The Extensible Markup Language (XML) is a subset of the Standard Generalized Markup Language (SGML) and its goal is to enable generic SGML to be served, received, and processed on the Internet. XML has been designed for ease of implementation and for interoperability with both SGML and the Hyper Text Markup Language (HTML). Therefore, in one aspect, XML can be thought of as a serialization format or transfer syntax. In another aspect, the emphasis is shifted from the textual aspects of XML to the structural aspects of XML. The layering of XML technologies allows the XML structure to be used as a common language by disparate software agents, such that the software agents can exchange information and instructions across language, process, host, and vendor boundaries.

Entities are the basic components of XML. One or more entities can form a single structured data object, which is referred to as an XML document. An XML document has both a physical and a logical structure. The physical structure is the collection of entities, which typically corresponds to files or network messages. The logical structure is defined by a document information item. The document information item acts as a root of a hierarchical tree of information items. Examples of information items include processing instruction information items, comment information items and character information items. Each information item has one or more named properties. Two of these properties serve to make the hierarchical structure explicit: a parent property, which references an information item at a higher level in the hierarchical tree, and a children property which references an ordered collection of immediate descendents in the hierarchical tree of information items. A software module called an XML processor reads XML documents and provides access to their content and structure. The XML processor typically gets instructions from a computer program application to read available XML data. The XML processor then and provides the read XML data to the requesting application.

XML schemas define vocabularies that can be used to describe XML documents. XML schemas are themselves XML documents that can be parsed and generated using the same technologies that are used to generate the XML documents they describe. The XML schema specification assumes that at least two XML documents are in use: an instance document and a schema document. The instance document contains the actual information of interest, and the schema document contains the structure and type of the instance document, and can thus be thought of as a "grammar" for the XML document. The distinction between schema and instance is similar to the distinction between class and object in object-oriented programming.

One of the more useful components of schemas is type definitions. XML schemas support two categories of types: simple types and complex types. Simple types are represented purely as text strings, while complex types describe the children and attributes of elements in an instance document. The schemas can therefore define allowable types of nodes at given levels in the hierarchical tree that represent the logical structure of the document, and relations between nodes in the hierarchical tree. Furthermore, XML schemas are highly adaptable to domains beyond XML, such as database and object technologies.

The hierarchical relationship between the information items of a given XML document lends itself to formally addressing subsets of the XML document (for example "give me all the child elements named bob whose id attribute is not id-xyz"). XPath expressions provide a simple text-based addressing language that captures the transversal of a document in a programming language-neutral fashion. The XPath expressions operate on the abstract, logical structure of an XML document, rather than the XML document's surface syntax. The XPath syntax is very similar to syntaxes used to traverse file systems or other hierarchical structures. For example the XPath expression "/guitars/guitar/model" locates all model elements that are children of guitar elements, which are themselves children of the root node guitars in some arbitrary XML document. In addition to its use for addressing nodes, XPath expressions can also be used for matching, i.e., testing whether a node matches one or more particular criteria. The searches can be made rather elaborate in order to precisely identify document subsets of interest. Further details and examples about XPaths and searches can be found in "XML Path Language (XPath), version 2.0 W3C working draft," by W3C® (MIT, INRIA, Keio), 22 Aug. 2003, which is incorporated herein by reference in its entirety (see http://www.w3.org/TR/xpath20/). Typically, when using XPath to test whether a node matches one or more particular criteria in an instance of an XML document, the entire tree of nodes is searched, which may be a time consuming task, particularly for large trees.

SUMMARY

In one aspect, the invention features a method for searching for one or more logical elements in a hierarchical tree structure of an extended markup language document conforming to a schema used for XML. The method includes the steps of (1) providing a representation of an extended markup language document instance containing two or more logical elements, wherein at least one logical element is a parent node and at least one logical element is a child node in a hierarchical tree structure describing the representation; (2) receiving a query for logical elements satisfying an XPath expression; and (3) searching in the hierarchical tree structure only nodes that potentially have child nodes satisfying the XPath expression. A preferred embodiment of the invention includes the further step, after receiving a query, of generating a collection of parent nodes that potentially have child nodes satisfying the XPath expression from a table relating a class of parent nodes and a class of child nodes, and using this table in the final searching step.

The invention also includes computer program products that have instructions to carry out the above steps.

Implementations of the invention can include a table that has entries containing hash representations of the parent nodes and child nodes; a listing of permitted child nodes for each parent node; or a listing of permitted parent nodes for each child node.

The invention can be implemented to realize one or more of the following advantages. Searches involving XML documents can be performed faster and more efficiently than what is currently possible. Only relevant parts of an XML tree structure need to be searched.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 shows a flowchart for searching an XML document.

FIG. 2 shows a hierarchical tree structure of an instance of an XML document.

FIG. 3 shows a graphical representation of an XML schema.

FIG. 4 shows how a search is carried out in the hierarchical tree structure of the XML document in FIG. 3.

Like reference symbols in the various drawings indicate like elements.

DETAILED DESCRIPTION

The invention will be described below by way of example of an XML document. It should, however, be noted that the same principles may apply to structures other than XML, such as scripting objects. Many applications expose part of their functionality programmatically through mechanisms such as scripting or automation. Such mechanisms typically involve execution of verbs on subjects and objects from a "scripting Object Model." An example statement is "Indent the third paragraph of the document named 'expense' in the application". Though XPath and XML Schemas are not typically used directly in this domain, there are similar mechanisms. That is, this mechanism is analogous to using an XPath statement. For example, in XPath terms, the above statement can be rephrased as Indent/application/document[@name="Expense"]/paragraph[3]." The point being that a similar more efficient searching technique can be used as long as something fills the role of XML Schema and XPath described below.

As can be seen in FIG. 1, a process (100) for searching an instance of an XML document starts by providing an instance of an XML document (step 105). The instance of the XML document is typically provided electronically and is read into a memory of a computer. All the operations that will be described below are performed on the in-memory representation of the XML document instance. The XML document instance typically contains two or more information items that are organized as nodes in a hierarchical, logical representation of the XML document instance.

FIG. 2 shows a schematic view of a hierarchical representation of an XML document instance (200). In particular, the XML document instance (200) shown in FIG. 2 represents a purchase order. The purchase order contains a root node (205). The root node (205) contains the following child nodes: a billTo node (210), a shipTo node (220), a comment node (215) and an items node (225). These child nodes can have further child nodes that form "grandchildren" of the root node (205), and so on. In the example shown in FIG. 2, the billTo node (210) has the child nodes name, street, city, state, and zip. The shipTo node (220) has the same types of nodes as child nodes (name, street, city, state, and zip). However, these nodes are separate and are not related to the child nodes of the billTo node (210). The comment node (215) does not have any child nodes. The items node (225) has a number of item nodes (230) as child nodes, each of which has the child nodes productName, quantity, USPrice and comment.

FIG. 3 shows a graphical representation (300) of an XML schema for the instance of the purchase order shown in FIG. 2. The XML schema (300) sets forth the allowable combinations of parent node types and child node types. As can be seen in FIG. 3, a root node (305) is allowed to have the child nodes billTo (310), shipTo (320), comment (315) and items (325). The billTo node (310) is allowed to have the child nodes name, street, city, state and zip. The shipTo node (320) is allowed to have the child nodes name, street, city, state and zip. The comment node (315) is not allowed to have any child nodes. The items node (325) is only allowed to have item nodes (330) as child nodes. The item node (330) is allowed to have productName, quantity, USPrice and comment as child nodes.

In one implementation of the invention, this XML schema is converted into a searchable data structure, such as a table, that lists all possible child node types for a given parent node type. Table 1 below shows such a table representation corresponding to the graphical representation (300) of the XML schema in FIG. 3. The left column of Table 1 lists all possible parent nodes, and the right column lists all possible descendent nodes for each of the parent nodes. In Table 1, the child nodes listed in the right column are child nodes that can be found at any level of the hierarchical tree below the parent node in question.

TABLE 1

| Parent node | Possible child nodes |
| --- | --- |
| Root | BillTo, ShipTo, Items, Comment, Name, street, city, state, zip, Item, ProductName, quantity, USPrice |
| BillTo | Name, street, city, state, zip |
| Comment | — |
| ShipTo | Name, street, city, state, zip |
| Items | Item, ProductName, quantity, USPrice, Comment |
| Item | ProductName, quantity, USPrice, Comment |

In another implementation of the invention, the XML schema is converted into a table that lists all possible parent node types for a given child node type. Table 2 below shows a table representation corresponding to the graphical representation (300) of the XML schema in FIG. 3. The left column of Table 2 lists all possible child nodes, and the right column lists all possible parent nodes for each of the child nodes. In Table 2, the parent nodes listed in the right column are parent nodes that can be found at any level above the child node in question.

TABLE 2

| Child node | Possible parent nodes |
| --- | --- |
| BillTo | Root |
| ShipTo | Root |
| Items | Root |
| Comment | Root, item, items |
| Name | BillTo, ShipTo, Root |
| Street | BillTo, ShipTo, Root |
| City | BillTo, ShipTo, Root |
| State | BillTo, ShipTo, Root |
| Zip | BillTo, ShipTo, Root |
| Item | Items, root |
| ProductName | Item, items, root |
| Quantity | Item, items, root |
| USPrice | Item, items, root |

The tables may be further processed to increase the speed of searches. For example, the entries in Tables 1 and 2 above can be converted into numerical hash representations, which allows a faster comparison with the query expression than what would be possible if text strings were compared.

Returning now to FIG. 1, after the XML document has been provided in step (105), the process receives an XPath query (step 110). For the sake of simplifying the explanation herein, only a simple example of an XPath query will be given, but it should be apparent from the discussion above that the XPath queries can be very complex and can include both element attributes and logistical relationships between elements of an XML document. In the present example it is assumed that the XPath query is: "Find all city nodes of the XML document instance."

The process then searches the table describing the rules for the document type, that is, the converted XML Schema to classify which nodes may be "interesting" nodes to look at (step 120). If a table such as Table 1 above is used, the interesting nodes to search are all nodes that potentially may have a city node as a child node. Those parent nodes are considered a "class" of parent nodes. As can be seen from Table 1 above, these nodes are the root node, the billTo node and the shipTo node. Searching any other nodes will never yield a child node of the type city, and will thus only consume extra time. Using a table such as Table 2, the process (100) does not have to search through the entire table, but can instead just locate the "city" entry in the left column of Table 2 and directly obtain the list of interesting nodes from the left column on the same table row, i.e., the root node, the billTo node and the shipTo node. The search may therefore be faster in this implementation. However, the table will typically be larger and use more computational resources to generate. Knowing which nodes will never yield any desired search results allows the process (100) to ignore these nodes in the hierarchical representation of the XML document instance and only search potentially interesting nodes. Thus, for each node that is encountered when traversing the hierarchical tree representation of the XML document instance, the process checks the node type against a list of "interesting" nodes to determine whether the node may have any child nodes satisfying the received query.

If the node potentially has child nodes or a class of child nodes satisfying the query, the process searches those child nodes or class of child nodes (step 125). If the process discovers that a node cannot have any child nodes satisfying the received query, the process ignores that node or class of nodes (step 130).

After a node has been searched or ignored, the process (100) checks whether there are any more nodes to examine (step 135). If there are more nodes, the process returns to step 120 and performs steps 120-135 again, as described above. If there are no more nodes to search, the process continues to step 140, where the search ends and the result is presented in response to the query.

The benefits of the above-described search mechanism can be seen in FIG. 4, where the search in accordance with the invention is carried out only along the dashed paths (405). Expressed differently, a "pruned" hierarchical tree is searched, in which the entire "items" subtree (410) is avoided. As a result, substantial time and computational savings are achieved, as compared to a conventional search method in which every node in the hierarchical tree (400) is searched.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. XML schemas can be replaced by other types of rule sets for XML documents, such as DTDs (Document Type Definitions) or RelaxNg schema, which are both applicable to XML documents.

What is claimed is:

1. A method for searching for one or more logical elements in a hierarchical tree structure of an extensible markup language (XML) document conforming to a schema used for XML, comprising:
   providing a representation of an XML document instance containing two or more logical elements, wherein at least one logical element is a parent node and at least one logical element is a child node in a hierarchical tree structure describing the representation;
   receiving a query for logical elements satisfying an XPath expression;
   searching in the hierarchical tree structure only nodes that potentially have child nodes satisfying the XPath expression; and
   providing the logical elements satisfying the XPath expression.

2. The method of claim 1, including the further step of generating a collection of parent nodes that potentially have child nodes satisfying the XPath expression from a table relating a class of parent nodes and a class of child nodes, and wherein the table is used in the final searching step.

3. The method of claim 1, including the further step of generating a collection of parent nodes that potentially have child nodes satisfying the XPath expression from a table relating parent nodes and child nodes, and wherein the table is used in the searching step.

4. The method of claim 2, wherein the table comprises entries containing hash representations of a class of parent nodes and a class of child nodes.

5. The method of claim 3, wherein the table comprises entries containing hash representations of the parent nodes and child nodes.

6. The method of claim 2, wherein the table comprises a listing of permitted classes of child nodes for each class of parent node.

7. The method of claim 3, wherein the table comprises a listing of child nodes for each parent node.

8. The method of claim 2, wherein the table comprises a listing of permitted classes of parent nodes for each class of child node.

9. The method of claim 3, wherein table comprises a listing of permitted parent nodes for each child node.

10. The method of claim 1, further comprising:
    receiving a rule set identifying allowable combinations between child nodes and parent nodes in a hierarchical document structure;
    transforming the rule set into a table relating a class of parent nodes and a class of child nodes; and
    using the table in the searching step.

11. The method of claim 1, further comprising:
    receiving a rule set identifying allowable combinations between child nodes and parent nodes in a hierarchical document structure;
    transforming the rule set into a table relating parent nodes and child nodes; and
    using the table in the searching step.

12. The method of claim 10, wherein:
    the rule set includes one of: an XML schema, a DTD, and a RelaxNg schema.

13. The method of claim 11, wherein:
    the rule set includes one of: an XML schema, a DTD, and a RelaxNg schema.

14. The method of claim 2, wherein the table includes a listing of a not-permitted class of child nodes for each class of parent node.

15. The method of claim 3, wherein the table includes a listing of not-permitted child nodes for each parent node.

16. The method of claim 2, wherein the table includes a listing of a not-permitted class of parent nodes for each class of child node.

17. The method of claim 3, wherein the table includes a listing of a not-permitted parent nodes for each child node.

18. The method of claim 1, further comprising the additional steps of:
    receiving a rule set identifying non-allowable combinations between child nodes and parent nodes in a hierarchical document structure; and
    transforming the rule set into a table relating a class of parent nodes and a class of child nodes.

19. The method of claim 1, further comprising the additional steps of:
    receiving a rule set identifying non-allowable combinations between child nodes and parent nodes in a hierarchical document structure; and
    transforming the rule set into a table relating parent nodes and child nodes.

20. A computer program product, tangibly encoded on a computer-readable storage medium, for searching for one or more logical elements in a hierarchical tree structure of an extensible markup language (XML) document conforming to a schema used for XML, comprising instructions operable to cause a programmable processor to:
    provide a representation of an XML document instance containing two or more logical elements, wherein at least one logical element is a parent node and at least one logical element is a child node in a hierarchical tree structure describing the representation;
    receive a query for logical elements satisfying an XPath expression;
    search in the hierarchical tree structure only nodes that potentially have child nodes satisfying the math expression; and
    provide the logical elements satisfying the XPath expression.

21. The computer program product of claim 20, wherein the instructions cause a programmable processor to generate a collection of parent nodes that potentially have child nodes satisfying the XPath expression from a table relating a class of parent nodes and a class of child nodes, and wherein the instructions cause the table to be used in the search.

22. The computer program product of claim 20, wherein the instructions cause a programmable processor to generate a collection of parent nodes that potentially have child nodes satisfying the XPath expression from a table relating parent nodes and child nodes, and wherein the instructions cause the table to be used in the search.

23. The computer program product of claim 21, wherein the table comprises entries containing hash representations of the class of parent nodes and class of child nodes.

24. The computer program product of claim 22, wherein the table comprises entries containing hash representations of the parent nodes and child nodes.

25. The computer program product of claim 22, wherein the table comprises a listing of a permitted class of child nodes for each class of parent node.

26. The computer program product of claim 21, wherein the table comprises a listing of permitted child nodes for each parent node.

27. The computer program product of claim 21, wherein the table comprises a listing of a permitted class of parent nodes for each class of child node.

28. The computer program product of claim 22, wherein the table comprises a listing of permitted parent nodes for each child node.

29. The computer program product of claim 20, further comprising instructions to:
   receive a rule set identifying allowable combinations between a class of child nodes and a class of parent nodes in a hierarchical document structure;
   transform the rule set into a table relating the class of parent nodes and the class of child nodes; and use the table in the search.

30. The computer program product of claim 20, further comprising instructions to:
   receive a rule set identifying allowable combinations between child nodes and parent nodes in a hierarchical document structure;
   transform the rule set into a table relating parent nodes and child nodes; and use the table in the search.

31. The computer program product of claim 29, wherein: the rule set includes one of: an XML schema, a DTD, and a RelaxNg schema.

32. The computer program product of claim 30, wherein: the rule set includes one of: an XML schema, a DTD, and a RelaxNg schema.

33. The computer program product of claim 21, wherein the wherein the table includes a listing of a class of not-permitted child nodes for each class of parent node.

34. The computer program product of claim 22, wherein the wherein the table includes a listing of not-permitted child nodes for each parent node.

35. The computer program product of claim 21, wherein the wherein the table includes a listing of a class of not-permitted parent nodes for each class of child node.

36. The computer program product of claim 22, wherein the wherein the table includes a listing of not-permitted parent nodes for each child node.

37. The computer program product of claim 20, further comprising instructions to:
   receive a rule set identifying non-allowable combinations between a class of child nodes and a class of parent nodes in a hierarchical document structure; and
   transform the rule set into a table relating the class of parent nodes and the class of child nodes.

38. The computer program product of claim 20, further comprising instructions to:
   receive a rule set identifying non-allowable combinations between child nodes and parent nodes in a hierarchical document structure; and
   transform the rule set into a table relating parent nodes and child nodes.

* * * * *